United States Patent Office 2,855,281
Patented Oct. 7, 1958

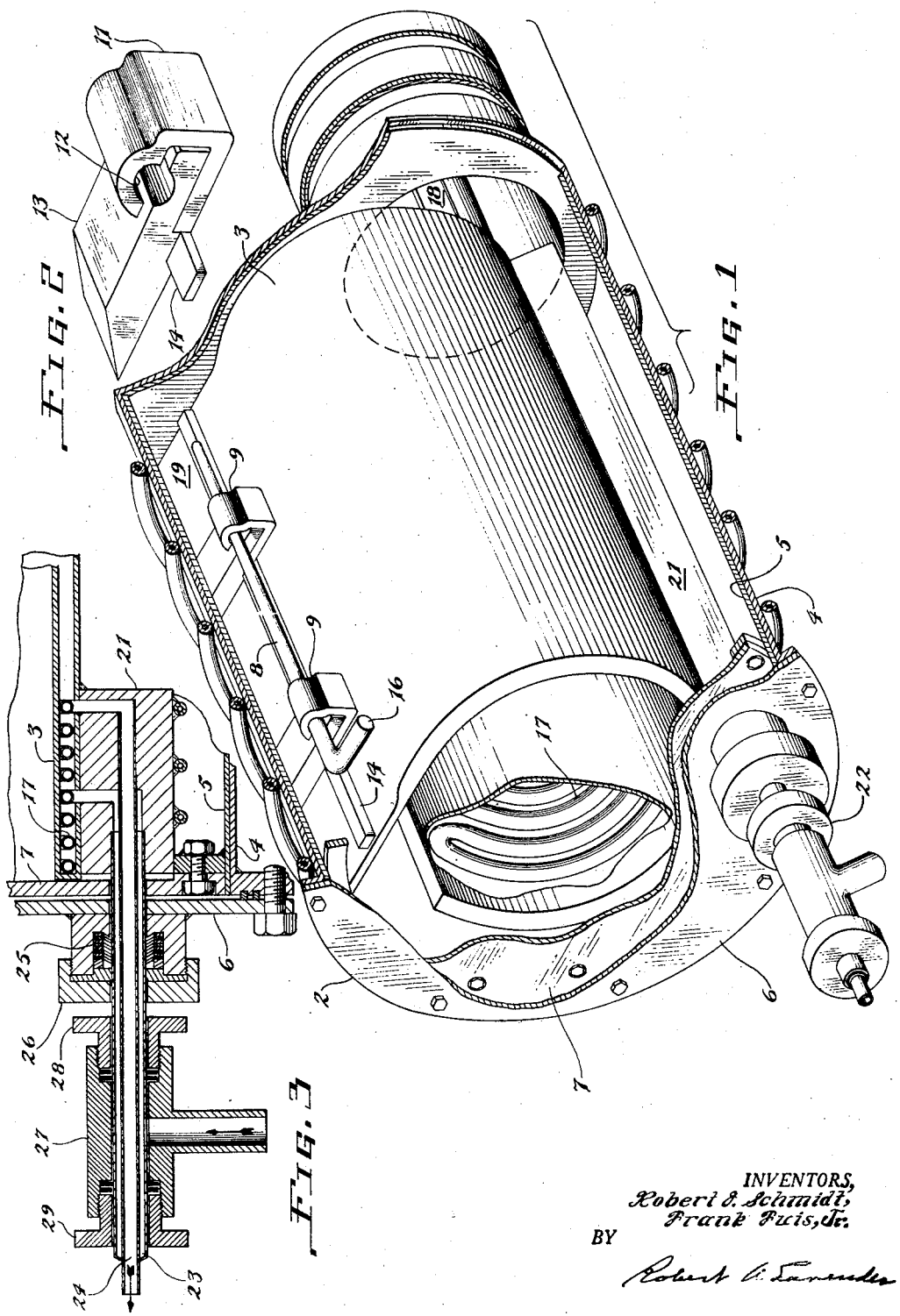

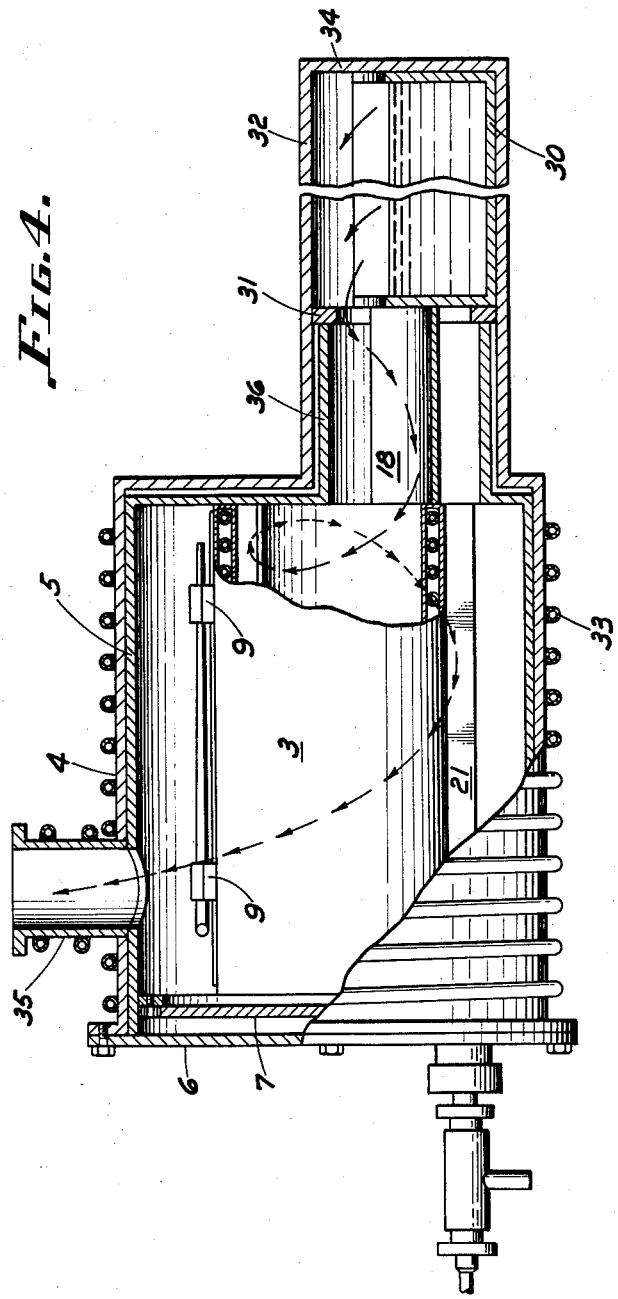

2,855,281

APPARATUS FOR CONDENSATION AND SUBLIMATION

Robert J. Schmidt and Frank Fuis, Jr., Oak Ridge, Tenn., assignors, by mesne assignments, to the United States of America as represented by the United States Atomic Energy Commission Application December 13, 1945, Serial No. 634,860

6 Claims. (Cl. 23—264)

This invention relates to an apparatus for the condensation of sublimed materials and to a process of condensation. More particularly this invention concerns a condensation apparatus and a method of condensation adapted for the condensing of sublimed uranium compounds for obtaining improved crystalline structure of the condensed material.

This invention constitutes an improvement in certain of the features described in the copending application of Krohn et al., Ser. No. 553,446, filed September 9, 1944, which matured into Patent No. 2,743,168 on April 24, 1956, and in which one of the inventors in this companion application is a co-inventor in the instant application. As described in said companion application, sublimation apparatus and processes have a number of uses in industry. In the copending application a valuable apparatus and process is described for use in processing various uranium compounds. It is sufficient to point out herein that the copending application disclosed a structure for volatilizing the compound under treatment and a condensing means which included a liner and spiral baffle whereby the sublimed materials were condensed in a special manner.

The particular improved construction described herein pertains especially to the condenser structure and process. Any suitable sublimation unit, such as that fully disclosed in said companion application, may be employed without change, as indicated in Fig. 4 herein. We have discovered, as fully described hereinafter, a construction whereby sublimed materials may be condensed under very carefully controlled conditions to give an improved condensate. Also the condensed materials may be conveniently removed from the apparatus by means of the demountable liner and baffle construction of the present invention thereby facilitating such sublimation operations.

This invention has for one object to provide an improved sublimed materials condenser construction and process of condensation of sublimate.

Still another object is to provide an improved sublimate condensation and process of condensation particularly applicable to the treatment of uranium materials.

Another object is to provide a sublimed materials condenser construction that has improved characteristics from the standpoint of temperature control, speed of operation, and ease of disassembly.

A still further object is to provide a sublimed materials condenser construction containing certain demountable parts and adapted to a wide range of temperature control.

A still further object is to provide a sublimed materials condenser of the aforementioned class particularly useful in the formation of large homogeneous crystals of the material being condensed.

Still another object is to provide a sublimed materials condenser of the type described that is adapted to operating in conjunction with a vacuum system and certain other associate parts and which cooperates therewith in a manner that the entire setup is subjected to fewer operational difficulties.

Another object is to provide a sublimed materials condenser construction particularly useful for condensing uranium halide vapors.

Still another object is to provide a process of condensation whereby control of crystal size of the sublimate may be obtained.

Another object is to provide a sublimation process wherein either cold, warm, or a combination type of condensation of sublimate may be accomplished.

Other objects will appear hereinafter.

We have found that suitable apparatus may be constructed for condensing sublimed materials comprising a condenser construction fitted with a removable liner and a special demountable baffle attached to the liner. The baffle is preferably of a generally spiral shape and is provided with a certain number of coils disposed within the surfaces of the baffle, the circulation of the temperature controlling medium being within the baffle. A special construction is also provided so that the cooling medium conduits may be disconnected. Also the entire construction is adapted to operate in a leak-proof manner under reduced pressure of a low order.

For a further understanding of our invention reference is made to the attached drawing forming a part of the present application.

Referring to the drawings,

Fig. 1 is a perspective view showing certain parts broken away and other parts in section showing the baffle, the demountable construction and the temperature controlling means.

Fig. 2 is a detailed view showing the demountable baffle holding means.

Fig. 3 is a detailed view, in section, of certain parts associated with the conduits furnishing the temperature controlling fluid.

Fig. 4 is a sectional elevation of a suitable sublimation unit in combination with our improved condenser.

Referring to Fig. 1, reference numeral 2 represents the complete condenser assembly. The removable special baffle of the present invention is shown at 3. As in said companion application the condenser comprises an outer shell 4 and the removable inner liner 5. That is, by removing the condenser head 6 access is had to closure 7 on the liner. These various closures are held in place by bolts as shown on the drawing.

The liner 5 contains the convolute or spiral baffle 3 held therein by means of a demountable construction comprising the long pin 8 through the several brackets 9.

As better shown in Fig. 2, the brackets are made up of several parts, namely U-shaped member 11 provided with a rounded recess 12 for the pin 8. This part 11 is welded or otherwise securely attached onto the baffle 3. The other part, namely part 13 is welded or otherwise securely fastened to the liner 5. A cross supported or reenforcing member 14 may be provided for supplying rigidity to the baffle. As apparent from the drawings the parts may be secured in place by the insertion of the tapered locking pin 8. A handle portion 16 on the pin provides a means of applying leverage by which the pin may be loosened when it is desired to disconnect the baffle from the liner.

Referring now to the baffle construction, the baffle may be of a double-walled construction containing a plurality of coils 17. In place of coils the double-walled section may be partitioned for distributing the temperature controlling fluid. At certain points on the baffle, however, there may be only a single-wall construction as at 18 and 19.

The coils 17 are connected to a header mechanism indicated at 21 and which will be described in further detail under Fig. 3. While this header mechanism has been shown extending across the entire width of the baffle, the exact width of header 21 would be governed by the number of coils 17 which the header is to supply and similar factors. Hence, the part 21 might only extend a part of the way across the baffle.

This last-mentioned means 21 is associated with the various fittings indicated overall by reference numeral 22 for providing vacuum tight inlet and outlet so that the conduits carrying temperature controlling fluid may be connected through the closures 6 and 7 to the baffle and function without loss of vacuum due to leakage around this joint.

Referring to Fig. 3, the above-mentioned vacuum tight means comprises a plurality of concentric tubes 23 and 24 which lead into the coils 17 of baffle 3 through the several closures 6 and 7. One of these conduits may be provided for introducing temperature controlling liquid and the other for withdrawing the liquid. The conduits are enclosed by a Wilson type seal or other vacuum tight construction 25 (not an integral part of the present invention and the details of which, therefore, are omitted) which is held in place by the nut 26. For details respecting such type of seal reference may be made to Review of Scientific Instruments, vol. 12 (1941), pp. 92–93. Other concentric conduit means 27 with associated sealing nuts 28 and 29 are provided so that a leak proof connection may be made to the conduit 23. By removing the various nuts 28 and 29, the various other parts may be removed so that the closures 6 and 7 (including the Wilson seal) may be pulled off over conduits 23 and 24 permitting access to the liner 5 and the baffle 3. These latter parts may then be removed, the spiral baffle being disassembled by means of removing pin 8 by turning handle 16.

As indicated, the construction described under Fig. 3 may include one or more seals known as the Wilson seal and packing material or equivalent construction for preventing leakage around conduits 23 and 24 into the apparatus.

The operation of the apparatus is to a large extent similar to the operation described in companion application of Krohn et al., supra. It is sufficient for the present invention to indicate that the sublimed materials enter the sublimed materials condenser at or about the single wall construction designated 18. The vapors enter the interior portion of the baffle and move along the inner walls to the outer walls of the spiral and are condensed on such walls in the desired manner by the flow of the temperature controlling medium in the coils 17, since this has a cooling effect upon the barrier walls. The sublimate not condensed on the interior of the spiral passes around to the outside of the spiral so that the remainder is thereby condensed on the outer portions of the baffle and on the liner. Any residual non-condensables leave the apparatus in a manner the same as described in said companion application, that is, through an exit duct which communicates with registering openings in the outer shell and the condenser. In general, in the condensation process the improved condensation is obtained by circulating a heated medium and changing the temperature of the medium circulated as the process progresses so that the temperature of the baffle is maintained between about 300°–400° C. thereby giving improved crystal structure to the condensed product. By means of this arrangement a large input of sublimed materials may be handled by the spiral condenser. At the conclusion of the process when the spiral condenser has completed its function, the head 6 is removed by disconnecting the sealing mechanism shown in Fig. 3 and unbolting head 7 whereby ready access may be had to the interior of the apparatus. The spiral may then be readily removed by turning the release member 16 and the spiral taken to a dry box for removing the condensate. Thereafter another demountable spiral and liner can be quickly inserted into the equipment and further processing carried out. In this connection, it will be understood that any appropriate detachable connections, such as removable rubber hose, may be employed to join the lines 23, 24 to the source of heating or cooling fluid. In removing the baffle these connections are severed or detached and the studs are removed from the flange of outer shell 4, releasing head 6 from the shell. At this point, the arrangement of inner casing 5, baffle 3, and head 7 may be slid out of the outer casing 4, or the tee 27 and outer head 6 may be removed, and then the bolt securing head 7 to inner casing 5 taken out. If the former procedure is followed, removal of tee 27 and head 6 may be delayed until after the casing and baffle arrangement has been taken from the outer shell 4. In either event separation of the casing 5 and the baffle 3 is finally accomplished by moving the tapered pin 16 outwardly to loosen it and permit final disengagement of the parts 13 and 11 of the clamp, which are normally keyed together by the proper positioning of the key 8. Once these clamping elements have been disengaged and tee 27 and thimble 26 loosened, the baffle 3 may be readily slid out of casing 5.

In further detail one method of operation is to preheat the baffle to between 350° C.–450° C. by the circulation of hot fluid in coils 17. Likewise heating fluid would be circulated in the coils external to shell 5. This preheating is accomplished prior to conducting the vapors of sublimed materials into the apparatus. By such procedure the condensation of $FeCl_3$, $AlCl_3$ and other volatile impurities which tend to come off first in sublimation processes and which have heretofore, in the prior art, been condensed in the condenser while it was heating up, is prevented from doing so in the present arrangement, thereby giving a purer product.

While the sublimation processes of the present invention may be operated at below 50 mm. pressure as described in the companion application of Krohn et al., supra, it may also be operated at higher pressures and temperatures. In other words, various temperature-pressure conditions may be used as long as liquid phase conditions are not involved. The conditions should be such that the material under treatment should go from the solid phase to the vapor phase and then to condensation in the present apparatus. By being able to maintain the baffle and associated parts at any desired temperature, the sublimation may be conducted at higher pressures and at a slower rate than heretofore. Such slower sublimation gives a purer product in that there is less entrainment or other carrying over of impurities.

Therefore it may be seen that there is considerable flexibility in the construction and operation of the present invention. For example in addition to coils 17, electrical resistance heating elements may also be included for permitting a quicker preheating of the baffle. In place of using such usual heating fluids as steam, hot oil and the like, heat transfer mediums such as Dowtherm and the like may be circulated in the coils.

Referring to Fig. 4, showing the condenser in combination with a sublimation unit such as disclosed in the copending application of Krohn et al., supra, the outer shell of the condenser indicated at 4, has a reduced tubular extension 32 for housing a trough or boat 30 which is adapted to receive sublimation materials. One end of the trough 30 is adapted to abut against the end wall 34 of the extension 32, while the opposite end of the trough abuts against the end of extension 18 of the baffle 3, effectively limiting the flow of vapors from the materials of the trough 30 to a path extending into the interior of the baffle. The liner 5 has an opening in an upper portion intermediate its ends which is adapted to register with the outlet in shell 4 when the liner is in place. This outlet takes the form of a tube 35 connected to a vacuum pump (not shown) or other exhaust system.

The inner casing or liner has a tubular projection 36 which telescopes within extension 32 of the shell and abuts against a packing ring 31 which is sandwiched between the end of the trough 30 and the projecting portion 36 of the casing or liner 5. In this position the ring 31 effectively isolates the outer surface of liner 5 from the vapors evolved by the materials of trough 30 which might otherwise condense thereon. The tubes 33 extend about the outer surface of shell 4 and serve to carry heated liquids or a cooling medium for controlling the temperature of the casing. However, if desired, heat may be applied to the casing through the use of calrod or other heating elements wrapped about the outer surface of shell 4 in a manner similar to that disclosed in Fig. 1. Heat may be applied to the extension 32 of the shell by means of an electric furnace which telescopes thereover. A suitable form of such furnace is disclosed in Krohn et al., supra.

In Fig. 4 the solid and dotted arrows indicate the general path which the gaseous vapors follow. These vapors leave the trough or boat 30 and enter the condenser 4 and baffle 3 through extension 18 of the baffle which tends to deflect the vapors, causing them to pass along into the interior of the baffle. These vapors then travel along its interior surface to the edge of the baffle 3 and then travel back along the outer surface thereof to the exit duct or tube 35 for removal by the vacuum action of the vacuum source (not known).

It is to be understood that all matters contained in the above description and all examples given herein are illustrative only, and do not limit the scope of this invention, as it is intended to claim the invention as broadly as possible in view of the prior art.

We claim:

1. A sublimation apparatus of the character described comprising a condenser housing, a removable liner disposed within the housing, registering openings in the walls of the housing and liner for removal of gases, a coiled baffle of spiral configuration positioned within, having progressively large convolutions, and secured to the liner, the walls of said baffle providing condensing surfaces, means for disengaging the baffle from the liner to permit removal, and means for leading gaseous vapors into the interior of said baffle for traveling over its condensing surfaces.

2. A sublimation apparatus of the character described comprising a condenser housing, a removable liner disposed within the housing, registering openings in the walls of the housing and liner for removal of gases, a spiral baffle having progressively larger convolutions and whose walls provide outer condensing surfaces, positioned within the liner, tubular members for the passage of a temperature control medium disposed within the walls of the baffle, and means for feeding gaseous vapors into the interior of the baffle for contact with its condensing surfaces.

3. A sublimation apparatus of the character described comprising a condenser housing, a removable liner disposed within the housing, registering openings in the housing and liner for the removal of gases, a curved baffle disposed within and removably secured to the liner, coils disposed within the walls of the baffle for the circulation of a temperature control medium, and means for leading gaseous vapors into contact with the inner surfaces of said curved baffe.

4. A sublimation apparatus of the character described comprising an outer tubular housing, a removable liner disposed within the housing, registering openings in the housing and liner for removal of gases, a curved baffle disposed within said liner, means for removably securing said baffle to said liner including mating clamping elements joined to the liner and the baffle and a key for interlocking them, and means for leading gaseous vapors into the interior of the baffle for travel over the exposed surfaces of said baffle.

5. A sublimation apparatus of the character described comprising an outer tubular housing, a removable liner disposed within the housing, registering openings in the liner and housing for the removal of gases, a spiral baffle having progressively larger convolutions and whose walls provide exposed surfaces disposed within the liner, means for removably securing the baffle to the liner including mating clamping elements secured to the liner and baffle and having grooves therein for defining a key way, and a removable key for interlocking the clamping elements, tubing disposed within the walls of the baffle for the passage of a temperature control medium, and means for leading vapors into the interior of said baffle for contact with its exposed surfaces.

6. A sublimation apparatus of the character described comprising an outer tubular housing, a removable liner disposed within the housing, registering openings in the housing and liner for removal of uncondensed vapors, a spiral shaped baffle with spaced double walls defining a spiral chamber, and the outer exposed surfaces of said walls providing interior and outer condensing surfaces, said baffle being disposed within the liner, means for removably securing the baffle to the liner, including mating clamping elements mounted on the liner and the baffle and having depressions therein for registration to define a key way and a removable key for seating in said key way to interlock said clamping elements, tubing disposed between the walls of the baffle for the passage of a temperature control medium, means communicating with the tubing for supplying temperature control medium to and removing it from said tubing, and means for feeding gases to be condensed into the interior of the baffle for progressive travel over the interior and outer exposed surfaces thereof to said registering openings.

References Cited in the file of this patent

UNITED STATES PATENTS

| | | |
|---|---|---|
| 1,434,485 | D'Adrian | Nov. 7, 1922 |
| 1,478,750 | McElroy | Dec. 25, 1923 |
| 1,833,664 | Vandegrift | Nov. 24, 1931 |
| 1,956,133 | Rosenblad | Apr. 24, 1934 |

FOREIGN PATENTS

| | | |
|---|---|---|
| 355,272 | Great Britain | Aug. 17, 1931 |
| 552,254 | Great Britain | Mar. 30, 1943 |